United States Patent
Shiga et al.

(10) Patent No.: US 8,944,936 B2
(45) Date of Patent: Feb. 3, 2015

(54) GOLF BALL RESIN COMPOSITION AND GOLF BALL

(75) Inventors: Kazuyoshi Shiga, Kobe (JP); Ryo Murakami, Kobe (JP); Takahiro Shigemitsu, Kobe (JP)

(73) Assignee: SRI Sports Limited, Kobe (JP)

( * ) Notice: Subject to any disclaimer, the term of this patent is extended or adjusted under 35 U.S.C. 154(b) by 458 days.

(21) Appl. No.: 13/303,452

(22) Filed: Nov. 23, 2011

(65) Prior Publication Data

US 2012/0165121 A1    Jun. 28, 2012

(30) Foreign Application Priority Data

Dec. 28, 2010  (JP) ................................. 2010-293297

(51) Int. Cl.
| A63B 37/04 | (2006.01) |
|---|---|
| A63B 37/06 | (2006.01) |
| A63B 37/00 | (2006.01) |
| C08K 5/098 | (2006.01) |

(52) U.S. Cl.
CPC ......... *A63B 37/0036* (2013.01); *A63B 37/0048* (2013.01); *A63B 37/0051* (2013.01); *A63B 37/0061* (2013.01); *A63B 37/0062* (2013.01); *A63B 37/0064* (2013.01); *A63B 37/0065* (2013.01); *A63B 37/0059* (2013.01); *C08K 5/098* (2013.01); *A63B 37/0003* (2013.01); *A63B 37/0004* (2013.01); *A63B 37/0075* (2013.01); *A63B 37/0076* (2013.01); *A63B 37/0078* (2013.01); *A63B 37/008* (2013.01); *A63B 2037/0079* (2013.01)
USPC .......................................... 473/374; 473/377

(58) Field of Classification Search
USPC .................................. 473/324–378
See application file for complete search history.

(56) References Cited

U.S. PATENT DOCUMENTS

| 5,397,840 | A  * | 3/1995 | Sullivan et al. ................ 525/221 |
|---|---|---|---|
| 6,329,458 | B1 | 12/2001 | Takesue et al. |
| 6,653,403 | B2 * | 11/2003 | Dalton et al. .................... 525/72 |
| 7,026,395 | B2 * | 4/2006 | Dalton et al. .................... 525/72 |
| 7,230,045 | B2 * | 6/2007 | Rajagopalan et al. ......... 524/322 |
| 8,597,140 | B2 * | 12/2013 | Komatsu et al. ............... 473/373 |
| 2002/0013421 | A1 | 1/2002 | Takesue et al. |
| 2002/0099120 | A1 | 7/2002 | Takesue et al. |
| 2002/0165038 | A1 | 11/2002 | Abe |
| 2005/0256269 | A1 | 11/2005 | Takesue et al. |
| 2010/0216571 | A1 | 8/2010 | Umezawa et al. |
| 2010/0216572 | A1 | 8/2010 | Umezawa et al. |

(Continued)

FOREIGN PATENT DOCUMENTS

| JP | 9-220298 A | 8/1997 |
|---|---|---|
| JP | 2000-157646 A | 6/2000 |

(Continued)

OTHER PUBLICATIONS

English translation of Japanese Office Action, mailed Aug. 19, 2014, for Japanese Application No. 2010-293297.

*Primary Examiner* — Alvin Hunter
(74) *Attorney, Agent, or Firm* — Birch, Stewart, Kolasch & Birch, LLP

(57) ABSTRACT

An object of the present invention is to provide a golf ball resin composition excellent in resilience. Another object of the present invention is to provide a golf ball excellent in a shot feeling and resilience. The golf ball resin composition of the present invention is characterized in that a storage modulus E' (Pa) and a loss modulus E" (Pa) satisfy a following expression;

$$\log(E'/E''^2) \geq -6.08$$

when measured at the conditions of the temperature of 12° C., the oscillation frequency of 10 Hz, and a strain of 0.05% in a tensile mode using a dynamic viscoelasticity measuring apparatus.

14 Claims, 1 Drawing Sheet

(56) References Cited

U.S. PATENT DOCUMENTS

| | | |
|---|---|---|
| 2010/0234137 A1 | 9/2010 | Higuchi et al. |
| 2010/0298067 A1 | 11/2010 | Watanabe |

FOREIGN PATENT DOCUMENTS

| | | |
|---|---|---|
| JP | 2001-120686 A | 5/2001 |
| JP | 2001-348467 A | 12/2001 |
| JP | 2002-177417 A | 6/2002 |
| JP | 2002-219195 A | 8/2002 |
| JP | 2004-524418 A | 8/2004 |
| JP | 2010-194313 A | 9/2010 |
| JP | 2010-194315 A | 9/2010 |
| JP | 2010-214105 A | 9/2010 |
| JP | 2010-269146 A | 12/2010 |
| WO | WO 02/079319 A2 | 10/2002 |

* cited by examiner

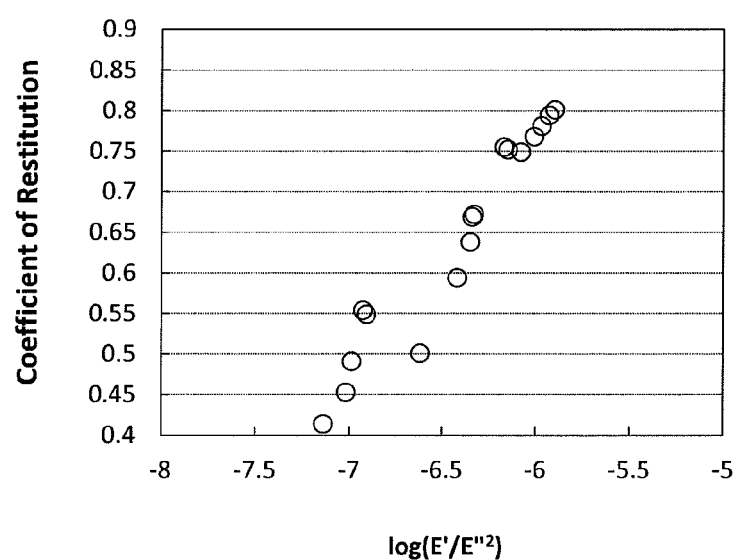

GOLF BALL RESIN COMPOSITION AND GOLF BALL

FIELD OF THE INVENTION

The present invention relates to a golf ball resin composition and a golf ball using the same.

DESCRIPTION OF THE RELATED ART

As a golf ball construction, a one-piece golf ball comprising a golf ball body, a two-piece golf ball comprising a core and a cover, a three-piece golf ball comprising a core consisting of a center and a single-layered intermediate layer covering the center, and a cover covering the core, and a multi-piece golf ball comprising a core consisting of a center and at least two intermediate layers covering the center, and a cover covering the core are known. Ionomer resins are used as materials constituting each layer of golf balls. Use of the ionomer resins as the constituent member of the golf ball provides the golf ball traveling a great distance, because of its high stiffness. Accordingly, ionomer resins are widely used as a material constituting a cover or an intermediate layer of the golf ball.

Japanese Patent Publication No. 2000-157646 A discloses a golf ball cover composition having a melt index (MI) of 1 dg/sec. or more and primarily comprising a mixture of a base resin, blended with (d) a metal soap obtained by neutralizing an organic acid having up to 29 carbon atoms with a monovalent to trivalent metal ion, in a mass ratio of the base resin to the metal soap being 95:5 to 80:20, wherein the base resin comprises an ionomer resin component containing (a) a ternary ionomer resin consisting of a metal ion neutralized product of an olefin-unsaturated carboxylic acid-unsaturated carboxylate copolymer having an acid content of 12 wt % or less, and (b) a binary ionomer resin consisting of a metal ion neutralized product of an olefin-unsaturated carboxylic acid copolymer having an acid content of 15 wt % or less in a ratio of 40:60 to 100:0; and (c) an unneutralized random copolymer composed of olefin and unsaturated carboxylic acid monomers, in a mass ratio of the ionomer resin component to (c) the unneutralized random copolymer being 75:25 to 100:0.

Japanese Patent Publication No. 2002-177417 A discloses a golf ball material comprising a mixture which is essentially composed of 100 parts by mass of a base resin obtained by blending (a) an olefin-unsaturated carboxylic acid binary random copolymer and/or a metal ion-neutralized olefin-unsaturated carboxylic acid binary random copolymer with (b) an olefin-unsaturated carboxylic acid-unsaturated carboxylate ternary random copolymer and/or a metal ion neutralized olefin-unsaturated carboxylic acid-unsaturated carboxylate ternary random copolymer in a mass ratio of 100:0 to 30:70; (c) 5 to 80 parts by mass of a fatty acid and/or fatty acid derivative having a molecular weight of 280 to 1,500; and (d) 0.1 to 10 parts by mass of a basic inorganic metal compound capable of neutralizing acidic groups left unneutralized in the base resin and component (c).

Japanese Patent Publication No. 2002-219195 A discloses a golf ball material comprising a mixture which is composed of essential components: 100 parts by weight of a resinous component consisting of a base resin and (e) a non-ionomer thermoplastic elastomer, the base resin and the elastomer being blended in a weight ratio of 100:0 to 50:50; (c) 5 to 80 parts by weight of a fatty acid and/or fatty acid derivative having a molecular weight of 280 to 1,500; and (d) 0.1 to 10 parts by weight of a basic inorganic metal compound capable of neutralizing acidic groups left unneutralized in the base resin and component (c), wherein the base resin has (a) an olefin-unsaturated carboxylic acid binary random copolymer and/or a metal ion-neutralized olefin-unsaturated carboxylic acid binary random copolymer, blended with (b) an olefin-unsaturated carboxylic acid-unsaturated carboxylate ternary random copolymer and/or a metal ion neutralized olefin-unsaturated carboxylic acid-unsaturated carboxylate ternary random copolymer, in a weight ratio of 100:0 to 25:75.

Japanese Patent Publication No. 2004-524418 A discloses a soft and resilient golf ball ethylene copolymer. The ethylene copolymer is a thermoplastic composition comprising E/X/Y copolymers (where E is ethylene, X is a $C_3$ to $C_8$ $\alpha,\beta$ ethylenically unsaturated carboxylic acid, and Y is a softening comonomer selected from alkyl acrylate and alkyl methacrylate wherein the alkyl groups have from 1-8 carbon atoms), wherein a. the E/X/Y copolymer has a melt index measured in accord with ASTM D-1238, condition E, at 190° C. using a 2160 gram weight of at least 75 grams per ten minutes, b. X is about 2-30 wt. % of the E/X/Y copolymer and Y being about 17-40 wt. % of the E/X/Y copolymer, and c. at least 55% of X is neutralized by one or more alkali metal, transition metal, or an alkaline earth metal cations.

Japanese Patent Publication Nos. 2010-194313 and 2010-194315 disclose a multi-piece solid golf ball comprising a solid core encased by a cover of one or at least two layers, wherein the solid core has an inner core layer and an outer core layer, wherein the inner core layer is formed primarily of a resin composition obtained by mixing: 100 parts by mass of a base resin consisting of (A-I) 30 mass % to 100 mass % of an olefin-unsaturated carboxylic acid-unsaturated carboxylic acid ester random terpolymer and/or a metal salt thereof and (A-II) 0 mass % to 70 mass % of an olefin-unsaturated carboxylic acid random copolymer and/or a metal salt thereof, (B) 5 to 170 parts by mass of a fatty acid having a molecular weight of from 280 to 1,500 or derivatives thereof, and (C) 0.1 to 10 parts by mass of a basic inorganic metal compound capable of neutralizing acid groups in components (A) and (B).

SUMMARY OF THE INVENTION

Cured products of rubber compositions have been used for cores of golf balls. However, the cured products of the rubber compositions have a problem of not being recycled after molding the core since the cured products of the rubber compositions have no thermoplasticity. Although molding cores from thermoplastic resins capable of injection molding has been studied, a soft material with an excellent resilience like the cured product of the rubber composition has not been obtained.

The present invention has been achieved in view of the above circumstances. An object of the present invention is to provide a golf ball resin composition capable of injection molding with an excellent resilience. Another object of the present invention is to provide a golf ball with an excellent shot feeling and resilience.

The golf ball resin composition of the present invention is characterized in that a storage modulus E' (Pa) and a loss modulus E" (Pa) satisfy a following expression;

$$\log(E'/E''^2) \geq -6.08$$

when measured at the conditions of a temperature of 12° C., an oscillation frequency of 10 Hz, and a strain of 0.05% in a tensile mode using a dynamic viscoelasticity measuring apparatus. It is thought that the resilience of the golf ball resin composition becomes higher as the storage modulus E' (Pa) becomes larger or as the loss modulus E" (Pa) becomes smaller. In addition, hardness also increases as the storage modulus E' (Pa) becomes larger. In the above described expression, since the denominator is the second power of the loss modulus E" whereas the numerator is the first power of the storage modulus E', the above described expression means that reducing the loss modulus E" provides a larger improvement effect on the resilience than increasing the storage modulus E' to enhance the hardness. The golf ball resin composition has better resilience when the storage modulus E' (Pa) and the loss modulus E" (Pa) satisfy the above formula. The golf ball having a constituent member formed from such golf ball resin composition is excellent in shot feeling and resilience.

The golf ball resin composition of the present invention satisfying the above expression is not limited, as long as the golf ball resin composition contains a resin component. The golf ball resin composition preferably includes (A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms, and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester. Further, the golf ball resin composition preferably includes (B) a metal salt of a fatty acid.

According to the present invention, the golf ball resin composition capable of injection molding with an excellent resilience is obtained. The golf ball using the golf ball resin composition of the present invention provides an excellent shot feeling and resilience.

BRIEF DESCRIPTION OF THE DRAWINGS

FIG. 1 is a graph showing a relation between coefficient of Restitution and log (E'/E"$^2$).

DESCRIPTION OF THE PREFERRED EMBODIMENT

The golf ball resin composition of the present invention is characterized in that the storage modulus E' (Pa) and the loss modulus E" (Pa) satisfy a following expression;

$$\log(E'/E''^2) \geq -6.08$$

when measured at the conditions of the temperature of 12° C., the oscillation frequency of 10 Hz, and a strain of 0.05% in a tensile mode using a dynamic viscoelasticity measuring apparatus. The resilience of the golf ball resin composition increases when the storage modulus E' (Pa) and the loss modulus E" (Pa) satisfy the expression. Log (E'/E"$^2$) is more preferably −6.01 or more. Further, log (E'/E"$^2$) is, but not limited to, preferably −5.25 or less, more preferably −5.40 or less, because when the log(E'/E"$^2$) is −5.25, the coefficient of Restitution almost reaches the maximum value of 1. Log (E'/E"$^2$) is controlled by choosing appropriately the kinds, contents, or the like of (A) resin component and (B) component. In addition, log in the above expression is common logarithm.

The storage modulus E' (Pa) is preferably 1×10$^5$ Pa or more, more preferably 2×10$^5$ Pa or more, and is preferably 50×10$^7$ Pa or less, more preferably 49×10$^7$ Pa or less. If the storage modulus E' (Pa) is 1×10$^5$ Pa or more, a shape of a golf ball is maintained. If the storage modulus E' (Pa) is 50×10$^7$ Pa or less, the shot feeling becomes better. The loss modulus E" (Pa) is preferably 1×10$^3$ Pa or more, more preferably 2×10$^3$ Pa or more, and is preferably 2.1×10$^7$ Pa or less, more preferably 2.05×10$^7$ Pa or less. If the loss modulus E" (Pa) is 1×10$^3$ Pa or more, the durability becomes better. If the loss modulus E" (Pa) is 2.1×10$^7$ Pa or less, the resilience becomes better.

The reasons of employing the measurement conditions of the oscillation frequency: 10 Hz, the temperature: 12° C. as the conditions of measuring the dynamic viscoelasticity are follows. The contact time between the golf ball and a collision bar (cylindrical metallic material) is 500 micro seconds in measuring coefficient of restitution at 40 m/s. If this is considered as a deformation of one cycle, this deformation corresponds to a deformation at the several thousands Hertz. Based on the frequency and temperature superposition principle of the general ionomer resin, the dynamic viscoelasticity measured at the conditions of temperature: room temperature and oscillation frequency: several thousands Hertz corresponds to the dynamic viscoelasticity measured at the conditions of temperature: 12° C. and oscillation frequency: 10 Hz. It is thought that the reason why the strain is 0.05% is that the strain can be expressed by a liner strain of 0.05% because the strain in measuring the coefficient of restitution is in the range of a liner strain.

The golf ball resin composition of the present invention satisfying the above expression is, for example, obtained by modifying (A) at least one resin component selected from the group consisting of (a-1) the binary copolymer composed of an olefin and an α,β-unsaturated carboxylic acid having 3 to 8 carbon atoms; (a-2) the ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms, and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester in a desired manner. For example, the golf ball resin composition of the present invention is obtained by blending (B) the metal salt of the fatty acid into (A) the resin component.

First, (A) at least one resin component selected from the group consisting of (a-1) the binary copolymer composed of an olefin and an α,β-unsaturated carboxylic acid having 3 to 8 carbon atoms; (a-2) the ionomer resin consisting of a metal ion-neutralized product of a binary copolymer composed of an olefin and an α,β-unsaturated carboxylic acid having 3 to 8 carbon atoms; (a-3) the ternary copolymer composed of an olefin, an α,β-unsaturated carboxylic acid having 3 to 8 carbon atoms, and an α,β-unsaturated carboxylic acid ester; and (a-4) the ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester will be explained.

(a-1) component is a nonionic binary copolymer composed of an olefin and an α,β-unsaturated carboxylic acid having 3 to 8 carbon atoms wherein the carboxyl groups thereof are not neutralized. Further, (a-2) component includes an ionomer resin prepared by neutralizing at least a part of carboxyl groups in the binary copolymer composed of an olefin and α,β-unsaturated carboxylic acid having 3 to 8 carbon atoms with a metal ion.

(a-3) component is a nonionic ternary copolymer composed of an olefin, an α,β-unsaturated carboxylic acid having 3 to 8 carbon atoms, and an α,β-unsaturated carboxylic acid ester wherein the carboxyl groups thereof are not neutralized. (a-4) component includes an ionomer resin prepared by neutralizing at least a part of carboxyl groups in the ternary copolymer composed of an olefin and α,β-unsaturated carboxylic acid having 3 to 8 carbon atoms, and an α,β-unsaturated carboxylic acid ester with a metal ion.

In the present invention, "(a-1) the binary copolymer composed of an olefin and an α,β-unsaturated carboxylic acid having 3 to 8 carbon atoms" is sometimes merely referred to as "binary copolymer". "(a-2) The ionomer resin consisting of a metal ion-neutralized product of a binary copolymer composed of an olefin and an α,β-unsaturated carboxylic acid having 3 to 8 carbon atoms" is sometimes referred to as "the binary ionomer resin". "(a-3) The ternary copolymer composed of an olefin, an α,β-unsaturated carboxylic acid having 3 to 8 carbon atoms, and an α,β-unsaturated carboxylic acid ester" is sometimes merely referred to as "ternary copolymer". "(a-4) The ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester" is sometimes referred to as "the ternary ionomer resin".

The olefin preferably includes an olefin having 2 to 8 carbon atoms. Examples of the olefin, for example, are ethylene, propylene, butene, pentene, hexene, heptene, and octene. The olefin more preferably includes ethylene. Examples of the α,β-unsaturated carboxylic acid having 3 to 8 carbon atoms, for example, are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable.

(a-1) The binary copolymer preferably includes a binary copolymer composed of ethylene and (meth)acrylic acid. (a-2) The binary ionomer resin preferably includes the metal ion-neutralized product of the binary copolymer composed of ethylene-(meth)acrylic acid. (a-3) The ternary copolymer preferably includes a ternary copolymer composed of ethylene, (meth)acrylic acid, and (meth)acrylic acid ester. (a-4) The ternary ionomer resin preferably includes the metal ion-neutralized product of the ternary copolymer composed of ethylene, (meth)acrylic acid, and (meth)acrylic acid ester. Here, (meth) acrylic acid means acrylic acid and/or methacrylic acid.

The content of the α,β-unsaturated carboxylic acid component having 3 to 8 carbon atoms in (a-1) the binary copolymer or (a-3) the ternary copolymer is preferably 4 mass % or more, more preferably 5 mass % or more, and is preferably 30 mass % or less, more preferably 25 mass % or less.

The melt flow rate (190° C., 2.16 kg) of (a-1) the binary copolymer or (a-3) the ternary copolymer is preferably 5 g/10 min or more, more preferably 10 g/10 min or more, and even more preferably 15 g/10 min or more, and is preferably 1,700 g/10 min or less, more preferably 1,500 g/10 min or less, even more preferably 1,300 g/10 min or less. If the melt flow rate (190° C., 2.16 kg) of (a-1) the binary copolymer or (a-3) the ternary copolymer is 5 g/10 min or more, the golf ball resin composition has better fluidity, and thus it is easier to mold a constituent member. If the melt flow rate (190° C., 2.16 kg) of (a-1) the binary copolymer or (a-3) the ternary copolymer is 1,700 g/10 min or less, the resultant golf ball has better durability.

Specific examples of (a-1) the binary copolymer include an ethylene-methacrylic acid copolymer such as "Nucrel (registered trademark) (e.g. NUCREL N1050H, NUCREL N2050H, NUCREL N1110H, NUCREL N0200H) manufactured by Du Pont-Mitsui Polychemicals Co, and an ethylene-acrylic acid copolymer such as "Primacore (registered trademark) 5980I" available from Dow Chemical Company.

Specific examples of (a-3) the ternary copolymer include "Nucrel (registered trademark) (e.g. NUCREL AN4318, NUCREL AN4319) manufactured by Du Pont-Mitsui Polychemicals Co, and "Nucrel (registered trademark) (e.g. NUCREL AE) manufactured by E.I. du Pont de Nemours and Company, and "Primacore (registered trademark) (e.g. PRIMCOR AT310, PRIMCOR AT320) available from Dow Chemical Company. (a-1) The binary copolymer or (a-3) the ternary copolymer may be used alone or as a mixture of at least two of them.

The content of the α,β-unsaturated carboxylic acid having 3 to 8 carbon atoms of (a-2) the binary ionomer resin is preferably 15 mass % or more, more preferably 16 mass % or more, and even more preferably 17 mass % or more, and is preferably 30 mass % or less, more preferably 25 mass % or less. If the content of the α,β-unsaturated carboxylic acid having 3 to 8 carbon atoms is 15 mass % or more, the resultant constituent member has a desirable hardness. If the content of the α,β-unsaturated carboxylic acid having 3 to 8 carbon atoms is 30 mass % or less, since the hardness of the resultant constituent member does not become excessively high, the durability and shot feeling become better.

The degree of neutralization of the carboxyl groups contained in (a-2) the binary ionomer resin is preferably 15 mole % or more, more preferably 20 mole % or more, and is preferably 90 mole % or less, more preferably 85 mole % or less. If the degree of neutralization is 15 mole % or more, the resultant golf ball has better resilience and durability. On the other hand, If the degree of neutralization is 90 mole % or less, the golf ball resin composition has better fluidity (good moldability). The degree of neutralization of the carboxyl groups of (a-2) the binary ionomer resin can be calculated by the following expression.

Degree of neutralization (mol %) of the binary ionomer resin=(the number of moles of carboxyl groups neutralized in the binary ionomer resin/the number of moles of all carboxyl groups contained in the binary ionomer resin)×100

Examples of a metal ion used for neutralizing at least a part of carboxyl groups of (a-2) the binary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like.

Specific examples of (a-2) the binary ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329(Zn))" commercially available from Du Pont-Mitsui Polychemicals Co., Ltd.

Further, examples include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially available from E.I. du Pont de Nemours and Company.

Further, examples include "Iotek (registered trademark) (e.g. Iotek 8000 (Na), Iotek 8030 (Na), Iotek 7010 (Zn), Iotek 7030 (Zn))" commercially available from ExxonMobil Chemical Corporation.

(a-2) The binary ionomer resins may be used alone or as a mixture of at least two of them. It is noted that Na, Zn, Li, and Mg described in the parentheses after the trade names indicate metal types of neutralizing metal ions of the binary ionomer resins.

(a-2) The binary ionomer resin preferably has a bending stiffness of 140 MPa or more, more preferably 150 MPa or more, and even more preferably 160 MPa or more, and preferably has a bending stiffness of 550 MPa or less, more preferably 500 MPa or less, even more preferably 450 MPa or less. If the bending stiffness of (a-2) the binary ionomer resin is too low, the flight distance tends to be shorter because of the increased spin rate of the golf ball. If the bending stiffness is too high, the durability of the golf ball may be lowered.

(a-2) The binary ionomer resin preferably has the melt flow rate (190° C., 2.16 kg) of 0.1 g/10 min or more, more preferably 0.5 g/10 min or more, and even more preferably 1.0 g/10 min or more, and preferably has the melt flow rate (190° C., 2.16 kg) of 30 g/10 min or less, more preferably 20 g/10 min or less, and even more preferably 15 g/10 min or less. If the melt flow rate of (a-2) the binary ionomer resin is 0.1 g/10 min or more, the golf ball resin composition has better fluidity and thus it is easy to mold the thin layer. If the melt flow rate of (a-2) the binary ionomer resin is 30 g/10 min or less, the durability of the resultant golf ball becomes better.

(a-2) The binary ionomer resin preferably has a slab hardness of 50 or more, more preferably 55 or more, even more preferably 60 or more, and preferably has a slab hardness of 75 or less, more preferably 73 or less, even more preferably 70 or less in Shore D hardness. If the binary ionomer resin has a slab hardness of 50 or more in Shore D hardness, the resultant constituent member has a high hardness. If the binary ionomer resin has a slab hardness of 75 or less in Shore D hardness, the resultant constituent member does not become excessively hard and thus the obtained golf ball has better durability.

The content of the $\alpha,\beta$-unsaturated carboxylic acid having 3 to 8 carbon atoms in (a-4) the ternary ionomer resin is preferably 2 mass % or more, more preferably 3 mass % or more, and is preferably 30 mass % or less, more preferably 25 mass % or less.

The degree of neutralization of the carboxyl groups contained in (a-4) the ternary ionomer resin is preferably 20 mole % or more, more preferably 30 mole % or more, and is preferably 90 mole % or less, more preferably 85 mole % or less. If the degree of neutralization is 20 mole % or more, the resultant golf ball obtained by using the golf ball resin composition of the present invention has better resilience and durability. If the degree of neutralization is 90 mole % or less, the golf ball resin composition has better fluidity (good moldability). The degree of neutralization of the carboxyl groups in the ionomer resin can be calculated by the following expression.

Degree of neutralization (mol %) of the ionomer resin=(the number of moles of carboxyl groups neutralized in the ionomer resin/the number of moles of all carboxyl groups contained in the ionomer resin)×100

Examples of a metal ion used for neutralizing at least a part of carboxyl groups of (a-4) the ternary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like.

Specific examples of (a-4) the ternary ionomer resin include trade name "Himilan (registered trademark) (e.g. Himilan AM7327 (Zn), Himilan 1855 (Zn), Himilan 1856 (Na), Himilan AM7331 (Na), or the like)" commercially available from Du Pont-Mitsui Polychemicals Co., Ltd. Further, the ternary ionomer resins commercially available from E.I. du Pont de Nemours and Company include trade name "Surlyn (registered trademark) (e.g. Surlyn 6320 (Mg), Surlyn 8120 (Na), Surlyn 8320 (Na), Surlyn 9320 (Zn), Surlyn 9320W (Zn) or the like)". The ionomer resins commercially available from ExxonMobil Chemical Corporation include trade name "Iotek (registered trademark) (e.g. Iotek 7510 (Zn), Iotek 7520 (Zn) or the like)". It is noted that Na, Zn, Li, and Mg described in the parentheses after the trade names indicate metal types of neutralizing metal ions. (a-4) The ternary ionomer resins may be used alone or as a mixture of at least two of them.

(a-4) The ternary ionomer resin preferably has a bending stiffness of 10 MPa or more, more preferably 11 MPa or more, even more preferably 12 MPa or more, and preferably has a bending stiffness of 100 MPa or less, more preferably 97 MPa or less, even more preferably 95 MPa or less. If the bending stiffness of (a-4) the ternary ionomer resin is too low, the flight distance tends to be shorter because of the increased spin rate of the golf ball. If the bending stiffness is too high, the durability of the golf ball may be lowered.

(a-4) The ternary ionomer resin preferably has the melt flow rate (190° C., 2.16 kg) of 0.1 g/10 min or more, more preferably 0.3 g/10 min or more, and even more preferably 0.5 g/10 min or more, and preferably has the melt flow rate (190° C., 2.16 kg) of 20 g/10 min or less, more preferably 15 g/10 min or less, even more preferably 10 g/10 min or less. If the melt flow rate (190° C., 2.16 kg) of (a-4) the ternary ionomer resin is 0.1 g/10 min or more, the golf ball resin composition has better fluidity and thus it is easy to mold a thin layer. If the melt flow rate (190° C., 2.16 kg) of (a-4) the ternary ionomer resin is 20 g/10 min or less, the durability of the resultant golf ball becomes better.

(a-4) The ternary ionomer resin preferably has a slab hardness of 20 or more, more preferably 25 or more, even more preferably 30 or more, and preferably has a slab hardness of 70 or less, more preferably 65 or less, even more preferably 60 or less in Shore D hardness. If the ternary ionomer resin has a slab hardness of 20 or more in Shore D hardness, the resultant constituent member does not become excessively soft and thus the golf ball has higher resilience. If the ternary ionomer resin has a slab hardness of 70 or less in Shore D hardness, the resultant constituent member does not become excessively hard and thus the golf ball has better durability.

As (A) the resin component, (a-1) the binary copolymer, (a-2) the binary ionomer resin, (a-3) the ternary copolymer, and (a-4) the ternary ionomer resin may be used alone or as a mixture of at least two of them. The golf ball resin composition of the present invention preferably includes (a-3) the ternary copolymer or (a-4) the ternary ionomer resin as (A) the resin component, because the resultant constituent member does not become excessively hard, and thus the golf ball has higher resilience.

The golf ball resin composition of the present invention preferably contains (A) the resin component and (B) the metal salt of the fatty acid. If the golf ball resin composition contains (B) the metal salt of the fatty acid, the unneutralized carboxyl groups of (A) the resin component are neutralized and thus the resilience improves. In the followings, (B) the metal salt of the fatty acid will be explained. (B) The metal salt of the fatty acid is not limited, as long as the metal salt of the fatty acid is the metal salt of the aliphatic carboxylic acid. (B) The metal salt of the fatty acid may include any one of the metal salts of saturated fatty acids and the metal salts of the unsaturated fatty acids. (B) The metal salt of the fatty acid preferably includes the metal salt of the fatty acid having 18 to 30 carbon atoms, more preferably the metal salt of the fatty acid having 18 to 28 carbon atoms.

Specific examples the fatty acid component of (B) the metal salt of the fatty acid include stearic acid (C18), oleic acid (C18), linoleic acid (C18), linolenic acid (C18), 12-hydroxy stearic acid (C18), arachidic acid (C20), arachidonic acid (C20), behenic acid (C22), lignoceric acid (C24), nervonic acid (C24), cerotic acid (C26), montanic acid (C28), and melissic acid (C30). The above fatty acid components may be used solely or as a mixture of at least two of them. Among them, stearic acid, behenic acid or montanic acid is preferable as the fatty acid component.

Examples of metal components of (B) the metal salt of the fatty acid include: monovalent metal ions such as sodium, potassium, lithium, or the like; divalent metal ions such as magnesium, calcium, zinc, barium, cadmium, or the like; trivalent metal ions such as aluminum or the like; and other metal ions such as tin, zirconium, or the like. The above metal components may be used solely or as a mixture of at least two of them. Among these metal components, preferred are the divalent metals such as magnesium, calcium, barium, or the like.

Specific examples of (B) the metal salt of the fatty acids are magnesium stearate, calcium stearate, barium stearate, magnesium behenate, calcium behenate, barium behenate, magnesium montanate, calcium montanate, or barium montanate. (B) The metal salt of the fatty acids may be used solely or as a mixture of at least two of them.

The golf ball resin composition of the present invention preferably contains (B) the metal salt of the fatty acid in an amount of 25 parts or more, more preferably 33 parts or more, even more preferably 50 parts or more, and preferably contains (B) the metal salt of the fatty acid in an amount of 100 parts or less, more preferably 98 parts or less, even more preferably 95 parts or less, even more preferably 90 parts or less, with respect to 100 parts of (A) the resin component by mass. If the content of (B) the metal salt of the fatty acid is 25 parts by mass or more, the resilience of the golf ball improves, while if the content is 100 parts by mass or less, it is possible to suppress the lowering of the durability of the golf ball due to the increase in the low molecular weight component.

The golf ball resin composition of the present invention preferably contains only (A) the resin component as the resin component. However, the golf ball resin composition may contain a thermoplastic elastomer and a thermoplastic resin, as long as they do not impair the effect of the present invention.

Examples of other thermoplastic elastomers are a thermoplastic polyamide elastomer having a commercial name of "Pebax (e.g. "Pebax 2533")" commercially available from Arkema K. K.; a thermoplastic polyurethane elastomer having a commercial name of "Elastollan (e.g. "Elastollan XNY85A")" commercially available from BASF Japan Ltd; a thermoplastic polyester elastomer having a commercial name of "Hytrel (e.g. "Hytrel 3548", "Hytrel 4047")" commercially available from Du Pont-Toray Co., Ltd.; a thermoplastic polystyrene elastomer having a commercial name of "Rabalon (e.g. "Rabalon T3221C")" commercially available from Mitsubishi Chemical Corporation; and the like.

In the present invention, the golf ball resin composition may further contain a pigment component such as a white pigment (for example, titanium oxide) and a blue pigment, a weight adjusting agent, a dispersant, an antioxidant, an ultraviolet absorber, a light stabilizer, a fluorescent material, a fluorescent brightener, and the like, as long as they do not impair the effect of the present invention.

The content of the white pigment (for example, titanium oxide) is preferably 0.5 part or more, more preferably 1 part or more, and the content of the white pigment is preferably 10 parts or less, more preferably 8 parts or less, with respect to 100 parts of the resin component by mass. If the amount of the white pigment is 0.5 part by mass or more, it is possible to impart the opacity to the resultant golf ball constituent member. Further, if the amount of the white pigment is more than 10 parts by mass, the durability of the resultant golf ball may deteriorate.

The golf ball resin composition of the present invention can be obtained, for example, by dry blending the (A) component and the (B) component. Further, the golf ball resin composition of the present invention can be obtained by extruding the dry blended mixture in the form of pellet. The dry blending may be carried out using for example, a mixer capable of blending a raw material in the form of pellet, more preferably a tumbler type mixer. Extruding can be carried out by publicly known extruders such as a single-screw kneading extruder, a twin-screw kneading extruder, and a twin-single kneading extruder.

The golf ball resin composition of the present invention preferably has a hardness of 20 or larger, more preferably 25 or larger, and even more preferably 30 or larger in shore D hardness, and the golf ball resin composition preferably has a hardness of 65 or smaller, more preferably 60 or smaller, and even preferably 56 or smaller in shore D hardness. Use of the golf ball resin composition having a hardness of 20 or larger in shore D hardness provides the golf ball excellent in the resilience (flying distance). On the other hand, use of the golf ball resin composition having a hardness of 65 or smaller in shore D hardness provides the golf ball excellent in the shot feeling. Here, a hardness of the golf ball resin composition is a slab hardness of the golf ball resin composition that is molded into a sheet form. The method for the measurement is described later.

The golf ball resin composition of the present invention preferably has the melt flow rate (190° C., 2.16 kg) of 0.01 g/10 min or more, more preferably 0.05 g/10 min or more, and even more preferably 0.1/10 min or more, and preferably has 100 g/10 min or less, more preferably 80 g/10 min or less, and even more preferably 50 g/10 min or less. If the golf ball resin composition has the melt flow rate in the above range, the moldability into the golf ball constituent member is good.

The golf ball resin composition preferably has a bending stiffness of 10 MPa or more, more preferably 15 MPa or more, even more preferably 20 MPa or more, and preferably has a bending stiffness of 450 MPa or less, more preferably 400 MPa or less, even more preferably 350 MPa or less. Use of the golf ball resin composition having a bending stiffness of 10 MPa or more provides the golf ball excellent in the resilience (flying distance). On the other hand, if the bending stiffness is 450 MPa or less, the obtained golf ball becomes appropriately soft and thus the shot feeling becomes good.

The golf ball resin composition of the present invention preferably has a rebound resilience of 40% or more, more preferably 43% or more, even more preferably 46% or more. Use of the golf ball resin composition having a rebound resilience of 40% or more provides the golf ball excellent in the resilience (flying distance). Here, the bending stiffness and the rebound resilience of the golf ball resin composition are measured by molding the golf ball resin composition into a sheet form. The methods for the measurement are described later.

The golf ball of the present invention is not limited, as long as it comprises a constituent member formed from the golf ball resin composition of the present invention. For example, in a one-piece golf ball, in a two-piece golf ball comprising a single-layered core and a cover disposed around the core, in a three-piece golf ball comprising a core having a center and a single-layered intermediate layer disposed around the center, and a cover disposed around the core, and in a multi-piece golf ball comprising a core having a center and at least one intermediate layer disposed around the center, and a cover disposed around the core (including the three-piece golf ball mentioned above), anyone of constituent members is formed from the above golf ball resin composition. In one preferable embodiment, the golf ball comprises a core composed of at least one layer and a cover disposed around the core, wherein at least one layer of the core is formed from the golf ball resin composition of the present invention. In another preferable embodiment, the golf ball body of the one-piece golf ball is formed from the golf ball resin composition of the present invention. In particular, in one more preferable embodiment, the two-piece golf ball comprises a single-layered core and a cover disposed around the core, wherein the single-layered core is formed from the golf ball resin composition of the present invention. Also, in another more preferable embodiment, the multi-piece golf ball comprises a core having a center and at least one intermediate layer disposed around the center, and a cover disposed around the core, wherein the center is formed from the golf ball resin composition of the present invention.

In the following, the present invention will be explained based on the two-piece golf ball that comprises a core and a cover disposed around the core, wherein the core is formed from the golf ball resin composition of the present invention. However, the present invention is not limited to this embodiment.

The core, for example, is molded by injection molding the golf ball resin composition of the present invention. Specifically, it is preferred that the golf ball resin composition heated and melted at the temperature ranging from 160° C. to 260° C. is charged into a mold held under the pressure of 1 MPa to 100 MPa for 1 second to 100 seconds, and after cooling for 30 seconds to 300 seconds, the mold is opened.

The core preferably has a spherical shape. If the core does not have a spherical shape, the cover does not have a uniform thickness. As a result, there exist some portions where the performance of the cover is lowered.

The core preferably has the diameter of the 39.00 mm or more, more preferably 39.25 mm or more, and even more preferably 39.50 mm or more, and preferably has the diameter of 42.37 mm or less, more preferably 42.22 mm or less, and even more preferably 42.07 mm or less. If the core has the diameter of 39.00 mm or more, the thickness of the cover does not become too thick and thus the resilience becomes better. On the other hand, if the core has the diameter of 42.37 mm or less, the thickness of the cover does not become too thin, and hence a protection ability of the cover is sufficiently provided.

When the core has a diameter from 39.00 mm to 42.37 mm, a compression deformation amount (shrinking deformation amount of the core along the compression direction) of the core when applying a load from 98 N as an initial load to 1275 N as a final load is preferably 1.00 mm or more, more preferably 1.10 mm or more, and is preferably 5.00 mm or less, more preferably 4.90 mm or less, even more preferably 4.80 mm or less. If the compression deformation amount is 1.00 mm or more, the shot feeling of the golf ball becomes better. If the compression deformation amount is 5.00 mm or less, the resilience of the golf ball becomes better.

The surface hardness of the core is 20 or larger, more preferably 25 or larger, and even more preferably 30 or larger in shore D hardness, and is preferably 70 or smaller, more preferably 69 or smaller in shore D hardness. If the surface hardness is 20 or larger in shore D hardness, the core does not become so soft and the better resilience of the golf ball is obtained. If the surface hardness of the core is 70 or smaller in shore D hardness, the core does not become so hard and the better shot feeling is obtained.

The center hardness of the core is preferably 20 or larger, more preferably 22 or larger, and even more preferably 24 or larger in Shore D hardness. If the center hardness is less than 20 in shore D hardness, the core becomes so soft that the resilience of the golf ball tends to become lower. Further, the center hardness of the core is preferably 50 or smaller, more preferably 48 or smaller, and even more preferably 46 or smaller in Shore D hardness. If the center hardness is more than 50 in shore D hardness, the core becomes too hard, resulting in the poor shot feeling. In the present invention, the center hardness of the core is the hardness measured with the Shore D type spring hardness tester at the central point of a cut plane of a core which has been cut into two halves.

The core preferably contains a filler. The filler is mainly blended as a weight adjusting agent in order to adjust density of the golf ball as the final product within the range of 1.0 to 1.5 $g/cm^3$, and may be blended as required. Examples of the filler include an inorganic filler such as zinc oxide, barium sulfate, calcium carbonate, magnesium oxide, tungsten powder, and molybdenum powder. The amount of the filler to be blended in the resin composition is preferably 0.5 part or more, more preferably 1.0 part or more, and is preferably 30 parts or less, more preferably 20 parts or less based on 100 parts of the resin component by mass. If the amount of the filler to be blended is less than 0.5 part by mass, it becomes difficult to adjust the weight, while if it is more than 30 parts by mass, the weight ratio of the resin component becomes small and the resilience tends to be lowered.

The cover of the golf ball of the present invention is preferably formed from a cover composition containing a resin component. The resin component includes, for example, various resins such as an ionomer resin, polyester resin, urethane resins such as a thermoplastic urethane resin or two-component curable urethane resin, polyamide resin or the like; and a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polyurethane elastomer having a commercial name of "Elastollan (registered trademark) (e.g. "Elastollan XNY97A")" commercially available from BASF Japan Ltd.; a thermoplastic polystyrene elastomer having a commercial name of "Rabalon (registered trademark)" commercially available from Mitsubishi Chemical Corporation. These resin components are used solely or as a mixture of at least two of them.

The ionomer resin preferably includes the resins exemplified as (a-2) or (a-4) components.

The cover composition preferably contains the polyurethane resin (including polyurethane elastomer) or the ionomer resin, as the resin component. The content of the polyurethane resin or the ionomer resin in the resin component of the cover composition is preferably 50 mass % or more, more preferably 60 mass % or more, even more preferably 70 mass % or more.

In the present invention, in addition to the aforementioned resin component, the cover composition may further contain a pigment component such as a white pigment (for example, titanium oxide), a blue pigment, a red pigment, or the like; a weight adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 part by mass or more, it is possible to impart the opacity to the cover. If the amount of the white pigment is more than 10 parts by mass, the durability of the resultant cover may deteriorate.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

In the case of directly injection molding the cover composition, the cover composition extruded in the pellet form beforehand may be used for injection molding or the materials such as the resin components and the pigment may be dry blended, followed by directly injection molding the blended material. It is preferred to use upper and lower molds for forming a cover having a spherical cavity and pimples, wherein a part of the pimples also serves as a retractable hold pin. When molding the cover by injection molding, the hold pin is protruded to hold the core, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 to 5 seconds, and after cooling for 10 to 60 seconds, the mold is opened and the golf ball with the cover molded is taken out from the mold.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, roughly hexagonal shape, and another irregular shape. The shape of the dimples is employed solely or in combination at least two of them.

In the present invention, the thickness of the cover of the golf ball is preferably 2.0 mm or less, more preferably 1.6 mm or less, even more preferably 1.2 mm or less, most preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover. In addition, the durability and the wear resistance of the cover may deteriorate.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in lowering flying performance of the golf ball.

When the golf ball of the present invention has a diameter in a range from 40 mm to 45 mm, a compression deformation amount of the golf ball (shrinking amount of the golf ball in the compression direction thereof) when applying an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits the good shot feeling. On the other hand, if the compression deformation amount is 4.0 mm or less, the resilience is enhanced.

The present invention is explained based on the embodiment where the golf ball resin composition of the present invention is used for the core, but the golf ball resin composition of the present invention may be used as the center, the intermediate layers, and the cover. If the center is formed from the golf ball resin composition of the present invention, the intermediate layers may be formed from the resin components exemplified as the cover materials.

EXAMPLES

Hereinafter, the present invention will be described in detail by way of example. The present invention is not limited to examples described below. Various changes and modifications can be made without departing from the spirit and scope of the present invention.

[Evaluation Methods]

(1) Slab Hardness (Shore D Hardness)

Sheets with a thickness of about 2 mm were produced by hot press molding the golf ball resin composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(2) Melt Flow Rate (MFR) (g/10 min)

The MFR was measured using a flow tester (Shimadzu flow tester CFT-100C manufactured by Shimadzu Corporation) in accordance with JIS K7210. The measurement was conducted under the conditions of the measurement temperature 190° C. and the load of 2.16 kg.

(3) Rebound Resilience (%)

A sheet with a thickness of about 2 mm was produced by a hot press molding the golf ball resin composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50RH %). Preparation of the test piece and the testing method are based on JIS K6255.

(4) Compression Deformation Amount (mm)

A compression deformation amount of the spherical body (a shrinking amount of the spherical body in the compression direction thereof), when applying a load from 98 N as an initial load to 1275 N as a final load to the spherical body, was measured. The compression deformation amount of spherical body No. 11 was defined as an index of 1.00, and the compression deformation amounts of the other spherical bodies were represented by converting the compression deformation amounts of the spherical bodies into this index.

(5) Coefficient of Restitution

A 198.4 g of metal cylindrical object was forced to collide with each spherical body at a speed of 40 m/sec, and the speeds of the cylindrical object and the spherical body before and after the collision were measured. Based on these speeds and the mass of each object, coefficient of restitution for each spherical body was calculated. The measurement was conducted by using twelve spherical bodies for each spherical body, and the average value was regarded as the coefficient of restitution for the spherical body.

(6) Shot Feeling

An actual hitting test was carried out by ten amateur golfers (high skilled person) using a driver. Feeling at the shot was evaluated by each person according to the following criteria. Major result of the evaluations of ten golfers was employed as the result of the golf ball.

E (Excellent): Impact is small and feeling is good.
G (Good): Normal feeling.
P (Poor): Impact is large and feeling is poor.

(7) Measurement of Storage Modulus E' (Pa) and Loss Modulus E" (Pa)

The storage modulus E' (Pa) and the loss modulus E" (Pa) of the golf ball resin composition were measured at the following conditions.

Apparatus: Viscoelasticity measuring apparatus Rheogel-E4000 available from UBM CO., Ltd.
Test piece: A sheet having a thickness of 2 mm was produced by a hot press molding the golf ball resin composition and a test piece was cut out to have a width 4 mm and a length between the clamps of 20 mm.
Measuring mode: tensile mode
Measuring temp.: 12° C.
Oscillation frequency: 10 Hz
Measuring strain: 0.05%

[Production of the Spherical Body (Core)]

As shown in Tables 1 and 2, the blending materials were dry blended, followed by mixing with a twin-screw kneading extruder to extrude the blended material in the strand form into the chilled water. The extruded strand was cut with a pelletizer to prepare a golf ball resin composition in the form of pellet. Extrusion was performed in the following conditions: screw diameter=45 mm; screw revolutions=200 rpm; and screw L/D=35. The mixtures were heated to a temperature in a range from 160° C. to 230° C. at a die position of the extruder. The obtained golf ball resin composition in the form of pellet was injection molded at a temperature of 220° C. to prepare a spherical body (core) having a diameter of 40 mm.

TABLE 1

| | Spherical body No. | 1 | 2 | 3 | 4 | 5 | 6 | 7 | 8 | 9 | 10 |
|---|---|---|---|---|---|---|---|---|---|---|---|
| Golf ball resin composition | NUCREL AN4319 | — | — | — | — | — | — | — | 100 | 100 | 100 |
| | NUCREL N1560 | — | — | — | — | — | — | — | — | — | — |
| | Surlyn 6320 | 100 | 100 | 100 | 100 | 100 | 100 | 100 | — | — | — |
| | Magnesium behenate | 25.7 | 33.1 | 70.2 | 89.8 | 99.8 | 20 | 120 | — | — | — |
| | Behenic acid | — | — | — | — | — | — | — | — | — | — |
| | Magnesium hydrate | — | — | — | — | — | — | — | 0.54 | 1.08 | 1.63 |
| Properties | Melt flow rate (g/10 min) | 2.93 | 7.06 | 15.37 | 14.23 | 22 or more | 1.32 | 22 or more | 22 or more | 22 or more | 8.95 |
| | Shore D hardness | 49 | 53 | 54 | 55 | 56 | 46 | 58 | 34 | 37 | 40 |
| | Rebound resilience (%) | 58 | 60 | 61 | 62 | 63 | 50 | 51 | 42 | 47 | 50 |
| | E' ($\times 10^7$ Pa) | 32.4 | 41.5 | 44.0 | 46.7 | 49.4 | 26.5 | 55.3 | 7.86 | 8.15 | 11.0 |
| | E" ($\times 10^7$ Pa) | 1.97 | 2.07 | 2.03 | 1.99 | 1.99 | 2.40 | 3.44 | 1.82 | 1.46 | 1.57 |
| | Log (E'/E"$^2$) | −6.08 | −6.01 | −5.97 | −5.93 | −5.90 | −6.34 | −6.33 | −6.62 | −6.42 | −6.35 |
| | Compression deformation amount | 1.23 | 1.02 | 0.97 | 0.93 | 0.89 | 1.44 | 0.82 | 3.37 | 2.77 | 2.22 |
| | Coefficient of Restitution | 0.749 | 0.768 | 0.781 | 0.794 | 0.801 | 0.669 | 0.672 | 0.501 | 0.594 | 0.638 |
| | Shot feeling | E | E | E | E | E | E | G | E | E | E |

Formulation: parts by mass

TABLE 2

| | Spherical body No. | 11 | 12 | 13 | 14 | 15 | 16 | 17 |
|---|---|---|---|---|---|---|---|---|
| Golf ball resin composition | NUCREL AN4319 | — | — | — | 100 | 100 | 100 | 100 |
| | NUCREL N1560 | 100 | 100 | 100 | — | — | — | — |
| | Surlyn 6320 | — | — | — | — | — | — | — |
| | Magnesium behenate | — | — | — | — | 20.61 | 41.21 | 61.82 |
| | Behenic acid | — | — | — | 68.11 | 48.16 | 28.21 | 8.26 |
| | Magnesium hydrate | — | 2.03 | 3.05 | — | — | — | — |
| Properties | Melt flow rate (g/10 min) | 22 or more | 7.19 | 3.40 | 22 or more | 22 or more | 22 or more | 22 or more |
| | Shore D hardness | 53 | 63 | 63 | 44 | 47 | 45 | 47 |
| | Rebound resilience (%) | 37 | 55 | 56 | 26 | 30 | 31 | 33 |
| | E' ($\times 10^7$ Pa) | 71.2 | 63.5 | 55.0 | 53.9 | 64.2 | 60.0 | 57.3 |
| | E" ($\times 10^7$ Pa) | 7.75 | 3.07 | 2.79 | 8.62 | 8.21 | 7.67 | 6.84 |

TABLE 2-continued

| Spherical body No. | 11 | 12 | 13 | 14 | 15 | 16 | 17 |
|---|---|---|---|---|---|---|---|
| Log (E'/E''$^2$) | −6.93 | −6.17 | −6.15 | −7.14 | −7.02 | −6.99 | −6.91 |
| Compression deformation Amount | 1.00 | 0.71 | 0.79 | 1.44 | 1.26 | 1.39 | 1.08 |
| Coefficient of Restitution | 0.554 | 0.755 | 0.752 | 0.414 | 0.453 | 0.491 | 0.549 |
| Shot feeling | E | P | P | E | E | E | E |

Formulation: parts by mass

The materials used in Tables 1 and 2 are follows.

"Surlyn 6320": a magnesium ion neutralized ethylene-methacrylic acid-butyl acrylate ternary copolymer ionomer resin (melt flow rate (190° C., 2.16 kg): 1.0 g/10 min) available from E.I. du Pont de Nemours and Company "NUCREL AN 4319": an ethylene-methacrylic acid-butyl acrylate ternary copolymer (melt flow rate 190° C., 2.16 kg): 55 g/10 min, bending stiffness: 21 PMa) available from Du Pont-Mitsui Polychemicals Co., Ltd.

"NUCREL N1560": an ethylene-methacrylic acid copolymer (melt flow rate (190° C., 2.16 kg): 60 g/10 min, shore D hardness: 53, bending stiffness: 83 PMa) available from Du Pont-Mitsui Polychemicals Co., Ltd.

Magnesium Behenate: Wako Pure Chemical Industries, Ltd.
Behenic Acid: NOF Corporation
Magnesium Hydroxide: Wako Pure Chemical Industries, Ltd.

As is apparent from Tables 1 and 2, the resilience of the golf ball resin composition is enhanced, in the case that the golf ball resin composition is characterized in that a storage modulus E' (Pa) and a loss modulus E'' (Pa) satisfy a following expression;

$$\log(E'/E''^2) \geq -6.08$$

when measured at the conditions of the temperature of 12° C., the oscillation frequency of 10 Hz, and a strain of 0.05% in a tensile mode using a dynamic viscoelasticity measuring apparatus.

FIG. 1 is a graph showing a correlation between the coefficient of restitution and log (E'/E''$^2$). The result indicated that the coefficient of restitution increased as log (E'/E''$^2$) becomes larger. In particular, it is note that if log (E'/E''$^2$) was −6.08 or more, the core having the coefficient of restitution of 0.749 or more was obtained.

According to the present invention, the golf ball with the excellent resilience and shot feeling is obtained. This application is based on Japanese Patent application No. 2010-293297 filed on Dec. 28, 2010, the contents of which are hereby incorporated by reference.

What is claimed is:

1. A golf ball resin composition characterized in that a storage modulus E' (Pa) and a loss modulus E'' (Pa) satisfy a following expression;

$$\log(E'/E''^2) \geq -6.08$$

when measured at the conditions of a temperature of 12° C., an oscillation frequency of 10 Hz, and a strain of 0.05% in a tensile mode using a dynamic viscoelasticity measuring apparatus, and the golf ball resin composition comprises:
(A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms, and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester; and (B) a metal salt of a fatty acid in an amount ranging from 25 parts to 100 parts by mass, with respect to 100 parts by mass of (A) the resin component.

2. The golf ball resin composition according to claim 1, wherein the metal salt of the fatty acid is a metal salt of a fatty acid having 18 to 30 carbon atoms.

3. The golf ball resin composition according to claim 1, wherein the fatty acid component of the metal salt of the fatty acid includes stearic acid, behenic acid, or montanic acid.

4. The golf ball resin composition according to claim 1, wherein the metal component of the metal salt of the fatty acid includes magnesium, calcium, or barium.

5. The golf ball resin composition according to claim 1, wherein the (A) resin component comprises (a-3) the ternary copolymer composed of the olefin, the α,β-unsaturated carboxylic acid having 3 to 8 carbon atoms, and the α,β-unsaturated carboxylic acid ester, or (a-4) the ionomer resin consisting of the metal ion-neutralized product of the ternary copolymer composed of the olefin, the α,β-unsaturated carboxylic acid having 3 to 8 carbon atoms, and the α,β-unsaturated carboxylic acid ester.

6. The golf ball resin composition according to claim 1, wherein the golf ball resin composition has a hardness ranging from 20 to 65 in Shore D hardness.

7. The golf ball resin composition according to claim 1, wherein the golf ball resin composition has rebound resilience of 46% or more.

8. A golf ball comprising a core composed of at least one layer and a cover covering the core, wherein at least one layer of the core is formed from a golf ball resin composition characterized in that a storage modulus E' (Pa) and a loss modulus E'' (Pa) satisfy a following expression;

$$\log(E'/E''^2) \geq -6.08$$

when measured at the conditions of a temperature of 12° C., an oscillation frequency of 10 Hz, and a strain of 0.05% in a tensile mode using a dynamic viscoelasticity measuring apparatus, and the golf ball resin composition comprises:
(A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms, and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester; and (B) a metal salt of a fatty acid in an amount ranging from 25 parts to 100 parts by mass, with respect to 100 parts by mass of (A) the resin component.

9. The golf ball according to claim 8, wherein the metal salt of the fatty acid is a metal salt of a fatty acid having 18 to 30 carbon atoms.

10. The golf ball according to claim 8, wherein the fatty acid component of the metal salt of the fatty acid includes stearic acid, behenic acid, or montanic acid.

11. The golf ball according to claim 8, wherein the metal component of the metal salt of the fatty acid includes magnesium, calcium, or barium.

12. The golf ball according to claim 8, wherein the (A) resin component comprises (a-3) the ternary copolymer composed of the olefin, the α,β-unsaturated carboxylic acid having 3 to 8 carbon atoms, and the α,β-unsaturated carboxylic acid ester, or (a-4) the ionomer resin consisting of the metal ion-neutralized product of the ternary copolymer composed of the olefin, the α,β-unsaturated carboxylic acid having 3 to 8 carbon atoms, and the α,β-unsaturated carboxylic acid ester.

13. A one-piece golf ball comprising a golf ball body formed from a golf ball resin composition characterized in that a storage modulus E' (Pa) and a loss modulus E" (Pa) satisfy a following expression;

$$\log (E'/E''^2) \geq -6.08$$

when measured at the conditions of a temperature of 12° C., an oscillation frequency of 10 Hz, and a strain of 0.05% in a tensile mode using a dynamic viscoelasticity measuring apparatus, and the golf ball resin composition comprises:

(A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms, and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester; and (B) a metal salt of a fatty acid in an amount ranging from 25 parts to 100 parts by mass, with respect to 100 parts by mass of (A) the resin component.

14. The one-piece golf ball according to claim 13, wherein the metal salt of the fatty acid is a magnesium salt, calcium salt, or barium salt of a fatty acid having 18 to 30 carbon atoms.

* * * * *